(12) United States Patent
Kodera et al.

(10) Patent No.: US 10,059,170 B2
(45) Date of Patent: Aug. 28, 2018

(54) AIR CONDITIONING DEVICE FOR VEHICLE

(71) Applicant: Panasonic Intellectual Property Management Co., Ltd., Osaka (JP)

(72) Inventors: Yuji Kodera, Kanagawa (JP); Kentaro Kuroda, Osaka (JP); Katsuji Taniguchi, Kanagawa (JP); Yoshitoshi Noda, Kanagawa (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 16 days.

(21) Appl. No.: 15/332,075

(22) Filed: Oct. 24, 2016

(65) Prior Publication Data

US 2017/0036513 A1    Feb. 9, 2017

Related U.S. Application Data

(63) Continuation of application No. PCT/JP2015/002222, filed on Apr. 24, 2015.

(30) Foreign Application Priority Data

Apr. 25, 2014  (JP) .................................. 2014-091205

(51) Int. Cl.
*G05D 15/00* (2006.01)
*G05D 16/00* (2006.01)
(Continued)

(52) U.S. Cl.
CPC ........... *B60H 1/03* (2013.01); *B60H 1/00342* (2013.01); *B60H 1/00885* (2013.01);
(Continued)

(58) Field of Classification Search
CPC .. B60H 1/03; B60H 1/00342; B60H 1/00885; B60H 1/00899; B60H 1/02;
(Continued)

(56) References Cited

U.S. PATENT DOCUMENTS

2014/0223943 A1* 8/2014 Ichishi ................. B60H 1/3205
62/215

FOREIGN PATENT DOCUMENTS

JP    H06-068919 U    9/1994
JP    10-076837       3/1998
(Continued)

OTHER PUBLICATIONS

The Extended European Search Report dated Apr. 3, 2017 for the related European Patent Application No. 15783401.1.
(Continued)

*Primary Examiner* — Len Tran
*Assistant Examiner* — Gordon Jones
(74) *Attorney, Agent, or Firm* — Pearne & Gordon LLP

(57) ABSTRACT

An air conditioning device for vehicle includes a first water-refrigerant heat exchanger, a second water-refrigerant heat exchanger, a first bypass passage, and a second bypass passage. The first bypass passage branches at a point of a coolant passage from a cooling portion of a heating component in the vehicle to the second water-refrigerant heat exchanger, and the first bypass passage is capable of being communicated with the coolant passage at an upstream side of the first water-refrigerant heat exchanger. The second bypass passage bran at a point of the coolant passage from a heater core to the first water-refrigerant heat exchanger, and the second bypass passage is capable of being communicated with the coolant passage at a downstream side of the first water-refrigerant heat exchanger. A part of the first bypass passage which includes a downstream end and a part (Continued)

of the second bypass passage which includes an upstream end are shared.

6 Claims, 7 Drawing Sheets

(51) Int. Cl.
    *G05D 23/00*     (2006.01)
    *B60H 1/03*     (2006.01)
    *B60H 1/00*     (2006.01)
    *B60H 1/32*     (2006.01)
    *B60H 1/02*     (2006.01)

(52) U.S. Cl.
    CPC ........... *B60H 1/00899* (2013.01); *B60H 1/02* (2013.01); *B60H 1/323* (2013.01); *B60H 1/3213* (2013.01); *B60H 2001/00928* (2013.01); *B60H 2001/00949* (2013.01); *B60H 2001/3255* (2013.01); *B60H 2001/3257* (2013.01); *B60H 2001/3289* (2013.01)

(58) Field of Classification Search
    CPC .................. B60H 1/3213; B60H 1/323; B60H 2001/00928; B60H 2001/00949; B60H 2001/3255; B60H 2001/3257; B60H 2001/3289; B60H 1/08; F25B 6/04; F25B 25/005
See application file for complete search history.

(56) References Cited

FOREIGN PATENT DOCUMENTS

| | | |
|---|---|---|
| JP | 11-301254 | 11/1999 |
| JP | 2005-289095 | 10/2005 |

OTHER PUBLICATIONS

International Search Report of PCT application No. PCT/JP2015/002222 dated Aug. 4, 2015.

\* cited by examiner

AIR CONDITIONING DEVICE FOR VEHICLE

This application Continuation of International Application No. PCT/JP2015/002222, filed on Apr. 24, 2015, which in turn claims priority from Japanese Patent Application No. 2014-091205, filed on Apr. 25, 2014, the contents of all of which are incorporated herein by reference in their entireties.

TECHNICAL FIELD

The present disclosure relates to an air conditioning device for vehicle.

BACKGROUND

As a conventional heating system for vehicles, a hot-water heater is mostly used which provides heating for a vehicle interior by utilizing an engine coolant heated to a high temperature. Unexamined Japanese Patent Publication No. H10-076837 discloses an air conditioning device for vehicle that basically uses the existing hot-water heater and can enhance heating performance in comparison with an existing device by additionally including a configuration for using a heat pump to heat a coolant of the hot-water heater. The air conditioning device for vehicle in Unexamined Japanese Patent Publication No. H10-076837 is configured such that a coolant for cooling an engine is circulated through a condenser, a heater core, and an evaporator in this order in series, and fed back into the engine. The air conditioning device for vehicle in Unexamined Japanese Patent Publication No. H10-076837 enhances the heating performance by further heating the engine coolant in the condenser with a refrigerant discharged from a compressor.

SUMMARY

The present disclosure provides an air conditioning device for vehicle that can enhance heating performance by adjusting a water-refrigerant condenser and a water-refrigerant evaporator to have an appropriate water flow rate.

An air conditioning device for vehicle according to one aspect of the present disclosure includes a first water-refrigerant heat exchanger, a second water-refrigerant heat exchanger, a first bypass passage, and a second bypass passage. The first water-refrigerant heat exchanger exchanges heat between a refrigerant of low-temperature and low-pressure and a coolant for heat transport to vaporize the refrigerant of low-temperature and low-pressure. The second water-refrigerant heat exchanger exchanges heat between the refrigerant of high-temperature and high-pressure discharged from a compressor that compresses the refrigerant and the coolant to condense the refrigerant of high-temperature and high-pressure, and provides the heated coolant to a heater core that heats air to be sent into a vehicle interior. The first bypass passage branches at a point of a coolant passage from a cooling portion of a heating component in the vehicle to the second water-refrigerant heat exchanger, and the first bypass passage has a downstream end capable of being communicated with a point of the coolant passage at an upstream side of the first water-refrigerant heat exchanger. The second bypass passage has an upstream end branching at a point of the coolant passage from the heater core to the first water-refrigerant heat exchanger, and the second bypass passage is capable of being communicated with a point of the coolant passage at a downstream side of the first water-refrigerant heat exchanger. A part of the first bypass passage which includes the downstream end and a part of the second bypass passage which includes the upstream end are shared.

According to the present disclosure, heating performance can be enhanced by adjusting the water-refrigerant condenser and the water-refrigerant evaporator to have an appropriate water flow rate.

DESCRIPTION OF EMBODIMENT

Before the exemplary embodiment of the present disclosure described, a problem of a conventional air conditioning device for vehicle will briefly be described. Appropriate water flow rates for a condenser and an evaporator are different from each other in order to efficiently drive a cycle of a coolant. For example, during a heating operation in the case where an engine temperature is low and a water temperature of a coolant is also low, a water flow rate in the condenser is decreased, which enables the coolant to be sufficiently heated in the condenser. Therefore, the water temperature of the coolant can be raised.

On the other hand, if a water flow rate in the evaporator is decreased, the evaporator fails to normally evaporate a refrigerant, resulting in that the pressure balance of the refrigerant is lowered and the heating performance may be deteriorated.

The exemplary embodiment of the present disclosure will be described below in detail with reference to the drawings.

Figure 1:
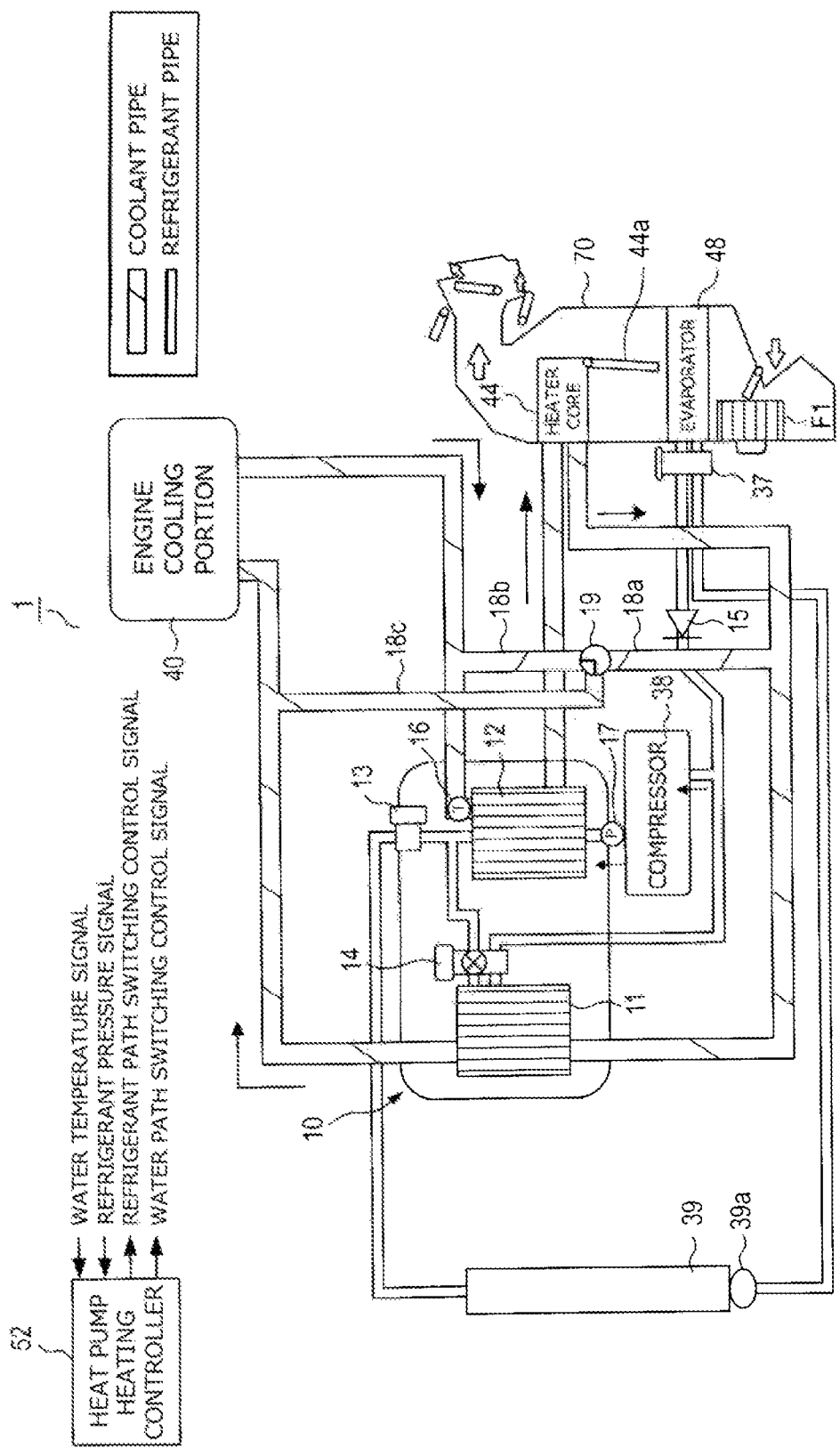
FIG. 1 is a diagram illustrating a configuration of an air conditioning device for vehicle according to an exemplary embodiment of the present disclosure.

FIG. 1 is a diagram illustrating a configuration of air conditioning device for vehicle 1 according to the exemplary embodiment of the present disclosure. Air conditioning device for vehicle 1 is mounted to a vehicle having an engine (internal combustion engine) serving as heating component provide air-conditioning for the vehicle interior.

Air conditioning device for vehicle 1 includes component unit 10, compressor 38, engine cooling portion 40, heater core 44, evaporator 48, expansion valve 37, outside condenser 39, and check valve 15, and further includes a coolant pipe, a refrigerant pipe, and the like which connect between these components. Heater core 44 and evaporator 48 are disposed in an intake passage of HVAC (Heating, Ventilation, and Air Conditioning) 70, HVAC 70 is provided with fan F1 that circulates intake air.

Compressor 38 is driven by engine power or electric power, compresses the suctioned refrigerant to a high temperature and high pressure, and discharges the resultant refrigerant. The compressed refrigerant is sent to component unit 10. A low-pressure refrigerant is suctioned into compressor 38 through unction pipe from first water-refrigerant heat exchanger 11 in component unit 10 or from evaporator 48.

Engine cooling portion 40 includes a water jacket that circulates a coolant around the engine and a pump that circulates the coolant through the water jacket and radiates heat from the engine to the coolant flowing through the water jacket. The pump is rotated by engine power, for example. Engine cooling portion 40 may be provided with a radiator that radiates heat to the outside air when the amount of waste heat from the engine increased. A passage the coolant in engine cooling portion 40 is communicated with heater core 44 through component unit 10.

The coolant may be an antifreeze liquid such as LLC (Long Life Coolant) for transporting heat.

The configuration for transferring the coolant can be configured to include only the pump in engine cooling portion 40. This enables reductions in cost and installation space of the device. A pump may additionally be provided to a different portion of the coolant pipe enhancing the coolant transfer capability.

Heater core 44 is a device for performing heat exchange between the coolant and air, and is disposed in the intake passage in HVAC 70 that supplies air to the vehicle interior. Heater core 44 is supplied with the heated coolant and radiates heat into the intake air to be sent to the vehicle interior (air to be cent to the vehicle interior) during a heating operation. Heater core 44 can adjust the amount of passing air according to the opening degree of door 44a. Door 44a is openable under an electric control. Door 44a may be referred to as an air-mix door.

Evaporator 48 is a device for performing heat exchange between a low-temperature and low-pressure refrigerant and air, and disposed in the intake passage in HVAC 70. Evaporator 48 is supplied with the low-temperature and low-pressure refrigerant during a cooling operation, a dehumidification operation, and a temperature control operation, and cools the intake air to be supplied to the vehicle interior (air to be sent to the vehicle interior).

Expansion valve 37 expands a high-pressure refrigerant to a low-temperature and low-pressure state and discharges the refrigerant to evaporator 48. Expansion valve 37 is disposed close to evaporator 48. Expansion valve 37 may be a thermal expansion valve (TXV) having a function of automatically adjusting the amount of the discharged refrigerant according to the temperature of the refrigerant sent from evaporator 48.

Outside condenser 39 has a passage for the flow of the refrigerant and a passage for the flow of the air, is placed near the front of the vehicle in the engine room, for example, and exchanges heat between the refrigerant and the outside air. A high-temperature and high-pressure refrigerant flows through outside condenser 39 in a cooling mode or a dehumidification mode, and discharges heat from the refrigerant to the outside air. The outside air is blown over outside condenser 39 by a fan, for example. Reservoir tank 39a may be provided to outside condenser 39 at the refrigerant outlet side.

Component unit 10 has an integrated configuration produced in a factory as a single element, and is connected to the other components of air conditioning device for vehicle 1 with pipes during the assembling step of the vehicle. Component unit 10 may be integrated such that each element is stored in one housing, or may be integrated such that each element may be joined together.

Component unit 10 includes first water-refrigerant heat exchanger 11, second water-refrigerant, heat exchanger 12, ON-OFF valve 13, and electromagnetic-valve-equipped expansion valve 14.

First water-refrigerant heat exchanger 11 (evaporator) includes a passage for the flow of the low-temperature and low-pressure refrigerant and a passage for the flow of the coolant, and exchanges heat between the refrigerant and the coolant. First water-refrigerant heat exchanger 11 is supplied with the low-temperature and low-pressure refrigerant from electromagnetic-valve-equipped expansion valve 14 in a predetermined operating mode, transferring heat from the coolant to the low-temperature and low-pressure refrigerant. Thus, first water-refrigerant heat exchanger 11 vaporizes the low-temperature and low-pressure refrigerant.

An inlet of first water-refrigerant heat exchanger 11 for the coolant is communicated with heater core 44 through a pipe, and an outlet for the coolant is communicated with engine cooling portion 40 through a pipe. An inlet of first water-refrigerant heat exchanger 11 for a refrigerant is communicated with electromagnetic-valve-equipped expansion valve 14 through a pipe, and an outlet for the refrigerant is communicated with a pipe which is joined to an intake port of compressor 38.

Second water-refrigerant heat exchanger 12 (condenser) includes a passage for the flow of the high-temperature and high-pressure refrigerant and a passage for the flow of the coolant, and exchanges heat between the refrigerant and the coolant. Second water-refrigerant heat exchanger 12 is supplied with the high-temperature and high-pressure refrigerant from compressor 38 in a predetermined operating mode, and heat is transferred from the high-temperature and high-pressure refrigerant to the coolant. Thus, second water-refrigerant heat exchanger 12 condenses the high-temperature and high-pressure refrigerant.

An inlet of second refrigerant heat exchanger 12 for the coolant is communicated with engine codling portion 40 through a pipe, and an outlet for the coolant is communicated with heater core 44 through a pipe. An inlet of second water-refrigerant heat exchanger 12 for a refrigerant is communicated with a discharge port of compressor 38 through a pipe, and an outlet for the refrigerant is communicated with ON-OFF valve 13 and electromagnetic-valve-equipped expansion valve 14 through a pipe.

ON-OFF valve 13 is a valve that opens or closes the refrigerant pipe under electric control, for example. ON-OFF valve 13 is an electromagnetic valve for example.

Electromagnetic-valve-equipped expansion valve 14 is a valve that opens or closes the refrigerant pipe under electric control, for example, and functions as an expansion valve when opened. When functioning as an expansion valve, electromagnetic-valve-equipped expansion valve 14 may be a TXV that automatically adjusts the flow rate of the refrigerant on the basis of the refrigerant temperature at the refrigerant outlet of first water-refrigerant heat exchanger 11.

Check valve 15 is a valve provided to a refrigerant pipe between compressor 38 and evaporator 48 to prevent a backflow of the refrigerant in an operating node in which the refrigerant does not flow into outside condenser 39 and evaporator 48. For example, an operating mode will be considered in which ON-OFF valve 13 is closed and the refrigerant flows through the refrigerant circuit that passes through first water-refrigerant heat exchanger 11 and second water-refrigerant heat exchanger 12. In this operating mode, ON-OFF valve 13 is closed and the refrigerant circuit that passes through outside condenser 39 and evaporator 48 is thereby blocked. However, even in this case, if the temperature of the outdoor air is low, the refrigerant pressure at outside condenser 39 and evaporator 48 may be dropped. Due to this pressure drop, the refrigerant flowing through the refrigerant circuit of first water-refrigerant heat exchanger 11 and second water-refrigerant heat exchanger 12 flows back to the refrigerant circuit on the evaporator 48 side. As a result, the amount of refrigerant of the refrigerant circuit that passes through first water-refrigerant heat exchanger 11 and second water-refrigerant heat exchanger 12 falls outside an optimum range. Consequently, the efficiency of the heat pump cycle is deteriorated. However, the presence of check valve 15 can avoid such disadvantage.

Temperature sensor 16 detects the temperature (also referred to as a water temperature) of the coolant and outputs a water temperature signal indicating the water temperature to heat pump heating controller 52. Temperature sensor 16 detects the temperature of the coolant at the inlet of second water-refrigerant heat exchanger 12. Temperature sensor 16 may detect the temperature at other portions such as the outlet of engine cooling portion 40, so long as the temperature of the coolant flowing through second water-refrigerant heat exchanger 12 can be estimated.

Pressure sensor 17 detects the discharge pressure of the refrigerant from compressor 38, and outputs a refrigerant pressure signal indicating a pressure to heat pump heating controller 52. Pressure sensor 17 may detect a pressure of the refrigerant at other portions, so long as the discharge pressure of the refrigerant can be estimated.

Heat pump heating controller 52 can be composed of a microcomputer or a sequencer. Heat pump heating controller 52 performs ON-OFF control of ON-OFF valve 13 and electromagnetic-valve-equipped expansion valve 14 to mainly perform a switching control of a heat-pump heating mode.

Bypass passage 18 includes a first bypass passage that branches at the passage for the coolant leading from engine cooling portion 40 to second water-refrigerant heat exchanger 12 so as to be capable of being communicated with the passage for the coolant at the upstream side of first water-refrigerant heat exchanger 11. Bypass passage 18 further includes a second bypass passage that branches at a point the passage for the coolant which leads from heater core 44 to first water-refrigerant heat exchanger 11 so as to be capable of being communicated with the passage for the coolant at downstream side of first water-refrigerant heat exchanger 11. In FIG. 1, the passage shared by the first bypass passage and the second bypass passage is defined as shared passage 18a, the part of the first bypass passage excluding shared passage 18a is defined as first branch passage 18b, and the part of second bypass passage excluding shared passage 18a is defined as second branch passage 18c.

Specifically, the first bypass passage is constituted by first branch passage 18b and shared passage 18a in order from the upstream side, and allows the coolant from engine cooling portion 40 to bypass second water-refrigerant heat exchanger 12 and heater core 14. On the other hand, the second bypass passage is constituted by shared passage 18a and second branch passage 18c in order from the upstream side, and allows the coolant from heater core 44 to bypass first water-refrigerant heat exchanger 11. As described above, in bypass passage 18, the part from the point of the first bypass passage to the downstream end and the part from the point of—the second bypass passage to the upstream end are shared as shared passage 18a. That is, a part of the first bypass passage which includes the downstream end, and a part of the second bypass passage which includes the upstream end are shared.

Selector 19 is provided on bypass passage 18. Selector 19 is formed into one unit for switching the communication state of shared passage 18a, first branch passage 18b, and second branch passage 18c under an electric control, for example. Selector 19 is an electromagnetic valve, for example.

Selector 19 switches to one of three communication states. The three communication states are the state of blocking all communication states of bypass passage 18 (hereinafter referred to as "no-bypass state"), the state of allowing only the communication between first branch passage 18b and shared passage 18a (hereinafter referred to as "condenser bypass state"), and the state of allowing only the communication between second branch passage 18c and shared passage 18a (hereinafter referred to as "evaporator bypass state"). For example, selector 19 has a condenser-side water valve and an evaporator-side water valve. The condenser-side water valve is opened in the state of allowing only the communication between first branch passage 18b and shared passage 18a. The evaporator-side water valve is opened in the state of allowing only the communication between second branch passage 18c and shared passage 18a. When the condenser-side water valve and the evaporator-side water valve are closed, bypass passage 18 is completely blocked.

Heat pump heating controller 52 is stored in a control box integrated with component unit 10. It is to be noted that the control box may be provided separately from a mechanical component in component unit 10.

Information for determining whether or not the heat-pump heating mode is required is input to heat pump heating controller 52. Specifically, this information is switch information (heat-pump heating activation signal) indicating ON-OFF of a heat pump heating switch which is not illustrated. The heat pump heating switch is an operation switch operable by a user. When the user turns on the heat pump heating switch to input the heat-pump heating activation signal, heat pump heating controller 52 can determine that the transition to the heat pump heating mode is required.

As the information for determining whether or not the heat pump heating node is required, heat pump heating controller 52 may receive environment information such as ambient temperature information, vehicle interior temperature information, or coolant temperature information, as well as information on, for example, setting of the vehicle interior temperature. The information for determining whether or not the heat pump heating mode is required may include status information of air conditioning device for vehicle 1 such as opening-degree information of door 44a. Not all of these information pieces need to be input, and only some of them may be input. On the basis of these information pieces, heat pump heating controller 52 detects lack of heat for heating, such as engine waste heat, and can determine that the transition to the heat pump heating mode is necessary.

Heat pump heating controller 52 receives a water-temperature signal from temperature sensor 16 and a refrigerant pressure signal from pressure sensor 17. Heat pump heating controller 52 outputs a water path switching control signal for switching the communication state of bypass passage 18 by selector 19. Specifically, heat pump heating controller 52 performs the control to divert the coolant to the first bypass passage or the second bypass passage of bypass passage 18 on the basis of the water-temperature signal or the refrigerant pressure signal. It is to be noted that heat pump heating controller 52 may control the flow rate in bypass passage 18 as well as the communication state of bypass passage 18 by selector 19. In this case, heat pump heating controller 52 may control the opening degree of selector 19 in a stepwise manner or in a stepless manner, or may control the rotating speed of the pump that transports the coolant.

[Switching Control of Water Path in Heat Pump Heating Mode]

Figure 2:
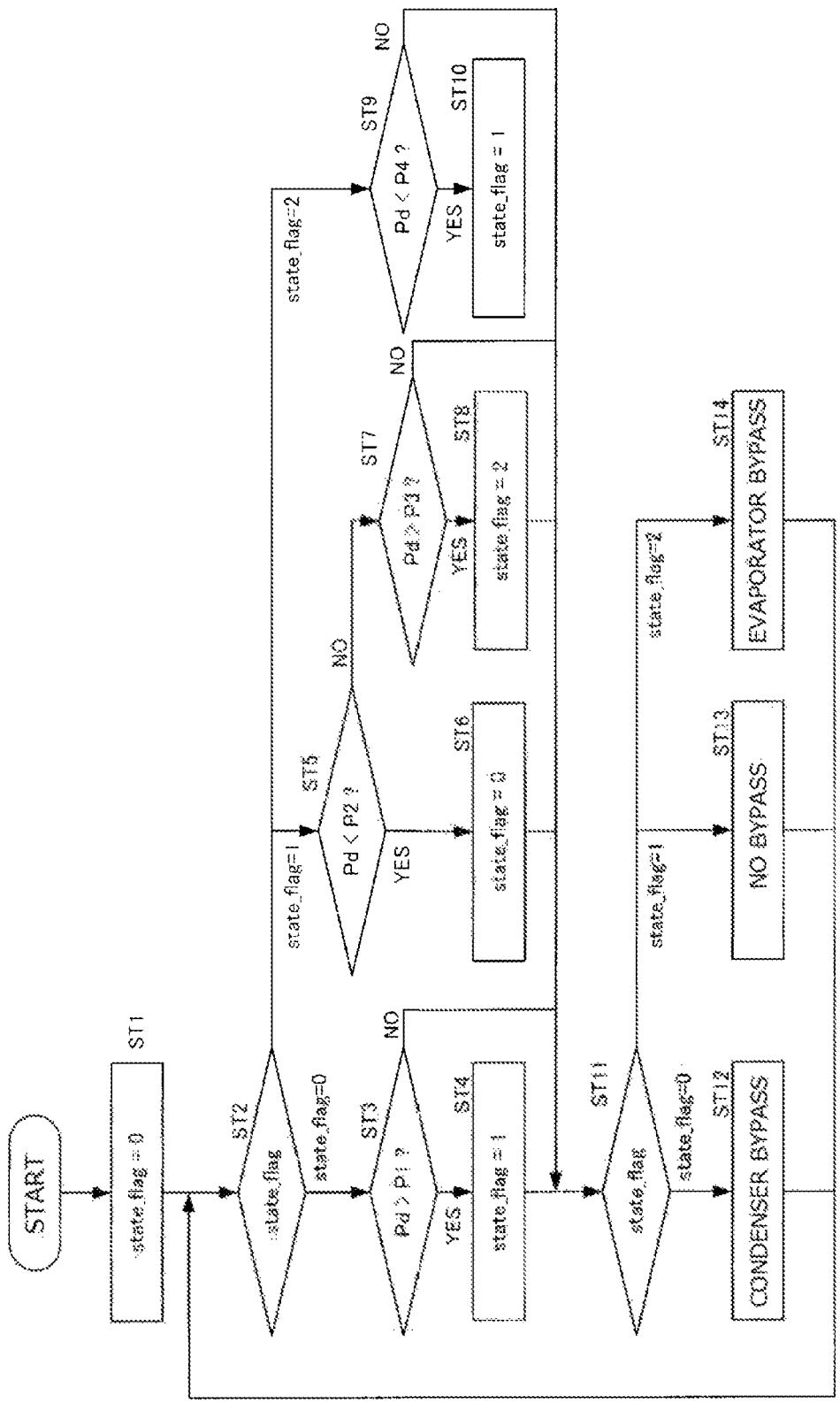
FIG. 2 is a flowchart for describing an operation of a heat pump heating controller in the air conditioning device for vehicle illustrated in FIG. 1.

FIG. 2 is a flowchart for describing the operation of the heat pump heating controller according to the exemplary embodiment. In FIG. 2, heat pump heating controller 52 performs, for example, switching control of a water path in bypass passage 18 on the basis of refrigerant pressure Pd indicated by the refrigerant pressure signal.

Heat pump heating controller 52 executes the control in FIG. 2 in the heat pump heating mode.

When the heat pump heating mode is started, heat pump heating controller 52 firstly initializes state_flag indicating the communication state of bypass passage 18 to 0 (step ST1). The state of "state_flag=0" indicates the condenser bypass state (the state in which the bypass by the first bypass passage is set). The state of "state_flag=1" indicates the no-bypass state (the state in which neither the bypass by the first bypass passage nor the bypass by the second bypass passage is set). The state of "state_flag=2" indicates the evaporator bypass state (the state in which the bypass by the second bypass passage is set).

That is, heat pump heating controller 52 switches the communication state of bypass passage 18 to the condenser bypass state when the heat pump heating mode is started. When the condenser bypass state has already been set, heat pump heating controller 52 keeps this state.

Then, heat pump heating controller 52 repeatedly executes the loop process in steps ST2 to ST14.

In step ST2, heat pump heating controller 52 determines what value (0 to 2) the current state_flag has. In addition, in steps ST3, ST5, ST9, heat pump heating controller 52 receives the output from pressure sensor 17 to acquire refrigerant pressure Pd discharge output of compressor 38).

In the case of "state_flag=0", pump heating controller 52 determines in step ST3 whether or not refrigerant pressure Pd is higher than threshold P1. When refrigerant, Pd is higher than threshold P1 (ST3: YES), heat pump heating controller 52 sets state_flag to 1 (step ST4). When refrigerant pressure Pd is equal to or lower than threshold P1 (ST3: NO), heat pump heating controller 62 keeps state_flag as (0).

In the case of "state_flag=1", heat pump heating controller 52 determines in step ST5 whether or not refrigerant pressure Pd is lower than threshold P2. When refrigerant pressure Pd is lower than threshold P2 (ST5: YES), heat pump heating controller 52 sets state_flag to 0 (step ST6).

When the refrigerant pressure Pd is higher than threshold P2 (ST5: NO), heat pump heating controller 52 determines whether or not refrigerant pressure Pd is higher than threshold P3 in step ST7. When refrigerant Pd is higher than threshold P3 (ST7: YES), heat pump heating controller 52 sets state_flag to (2) (step ST8). When refrigerant pressure Pd is equal to or lower than threshold P3 (ST7: NO) heat pump heating controller 52 keeps state_flag as (1).

In the case of "state_flag=2", heat pump heating controller 52 determines in step ST9 whether or not refrigerant pressure Pd is lower than threshold P4. When refrigerant pressure Pd is lower than threshold P4 (ST9: YES), heat pump heating controller 52 sets state_flag to 1 (step ST10).

When refrigerant pressure Pd is equal to or higher than threshold P4 (ST9: NO), heat pump heating controller 52 keeps state as (2).

Threshold P3 is set to a value lower than the upper limit (Pmax) of the refrigerant discharge pressure and higher than other thresholds P1, P2, P4.

Threshold P2 is set to be a value lower than other thresholds P1, P3, P4.

Threshold P1 is a value indicating the refrigerant discharge pressure for switching selector 19 to the no-bypass state from the condenser bypass state. Threshold P4 is a value indicating the refrigerant discharge pressure for switching selector 19 to the no-bypass state from the evaporator bypass state. In the present exemplary embodiment, thresholds P3, P1, P4, P2 are set to be decreased in this order in a stepwise manner (see FIGS. 4 and 5).

In step ST11, heat pump heating controller 52 determines what value (0 to 2) the current state_flag has. In the case of "state_flag=0", heat pump heating controller 52 outputs an instruction for switching selector 19 to the condenser bypass state (step ST12). In the case of "state_flag=1", it outputs an instruction for switching selector 19 to the no bypass state (step ST13). In the case of "state_flag=2", it outputs an instruction for switching selector 19 to the evaporator bypass state (step ST14). When the bypass state has already been set as the condenser bypass state, the no-bypass state, or the evaporator bypass state, heat pump heating controller 52 keeps the current state.

Specifically, in the case where the determination equation in each of steps ST3, ST5, ST7, and ST9 is satisfied, heat pump heating controller 52 switches the communication state of bypass passage 18 (steps ST12 to ST14).

Figure 3:
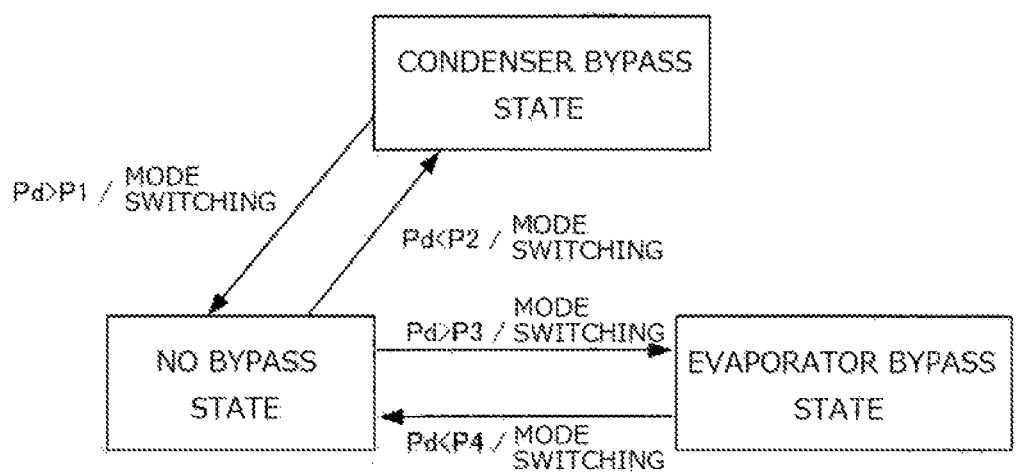
FIG. 3 is a diagram illustrating a state transition of a bypass passage according to a refrigerant pressure in the air conditioning device for vehicle illustrated in FIG. 1.

FIG. 3 illustrates the state transition of bypass passage 18 switched according to refrigerant pressure Pd. As illustrated in FIG. 3, when refrigerant pressure Pd becomes higher than threshold P3 (upper threshold) in the no-bypass state (step ST7: YES), heat pump heating controller 52 switches the communication state to the evaporator bypass state (state_flag=2). On the other hand, when refrigerant pressure Pd becomes lower than threshold P2 (lower threshold) in the no-bypass state (step ST5: YES), heat pump heating controller 52 switches the communication state to the condenser bypass state (state_flag=0).

When refrigerant pressure Pd becomes lower than threshold P4 in the evaporator bypass state (step ST9: YES), heat pump heating controller 52 switches the communication state to the no-bypass state (state_flag=1). When refrigerant pressure pd becomes higher than threshold P1 (middle-upper threshold) in the condenser bypass state (step ST3: YES), heat pump heating controller 52 switches the communication state to the no-bypass state state_flag=1).

Next, the operation example of the heat pump heating controller described above will be described.

[First Operation Example of Switching Control of Water Path in Heat Pump Heating Mode]

Figure 4:
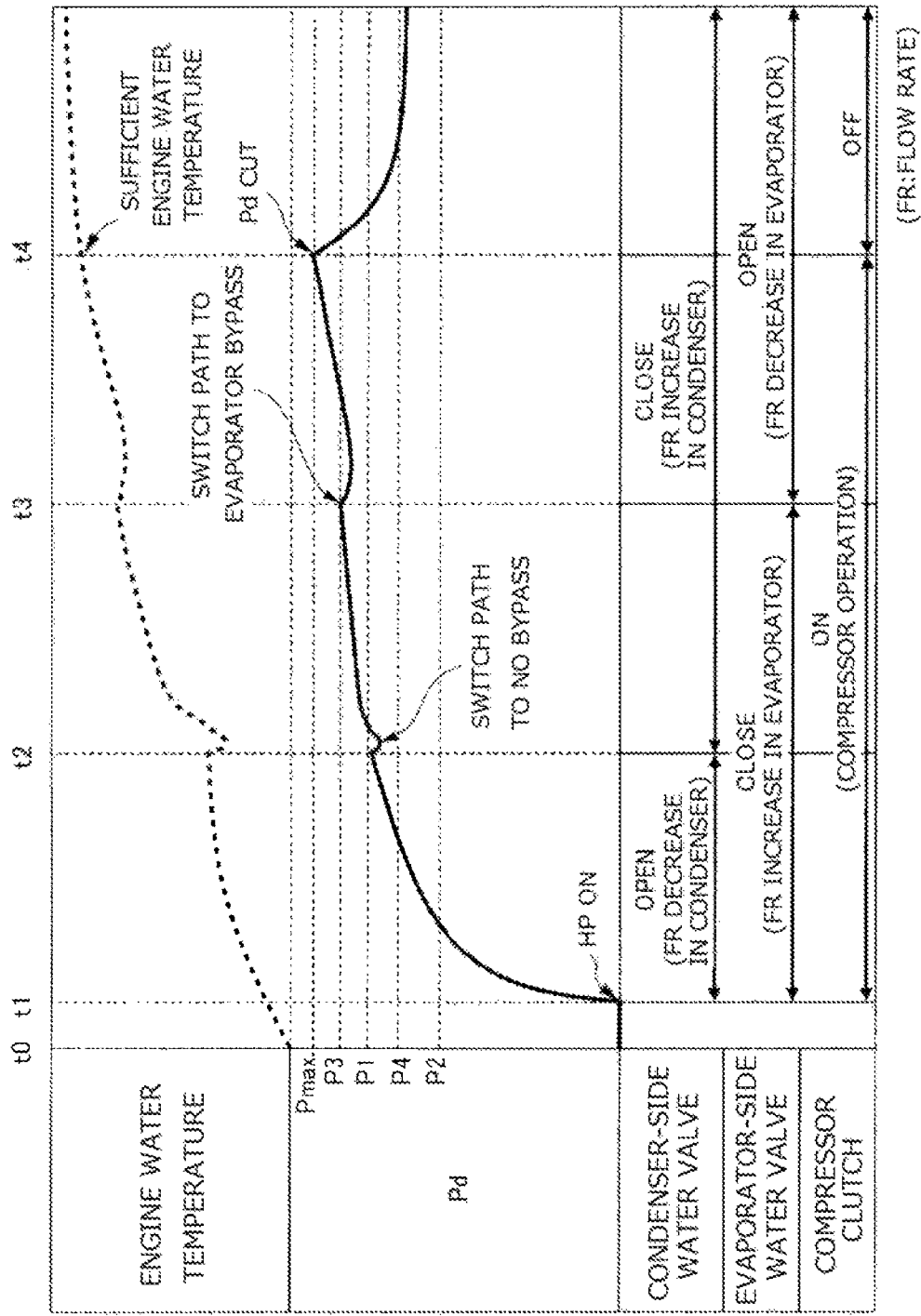
FIG. 4 is a diagram illustrating a control example of the heat pump heating controller in the air conditioning device for vehicle illustrated in FIG. 1.

FIG. 4 illustrates the control example in which air conditioning device for vehicle 1 reaches the state of being capable of providing heating for the vehicle interior only with the engine waste heat due to the gradual increase in the water temperature from the start of the engine and compressor 38.

In FIG. 4, the engine water temperature gradually increases from time t0.

At time t1, heat pump heating is activated, and compressor 38 is driven (HP: ON). At time t1, heat pump heating controller 52 causes selector 19 to switch the communication state to the condenser bypass state. That is, selector 19 opens the condenser-side water valve so as to allow communication between shared passage 18a and first branch passage 18b illustrated in FIG. 1. Thus, the flow rate of the coolant in second water-refrigerant heat exchanger 12 (condenser) is decreased. Therefore, the coolant can be rapidly heated in second water-refrigerant heat exchanger 12, whereby quick heating performance can be enhanced. In addition, refrigerant pressure Pd rapidly increases.

At time t2 refrigerant pressure Pd exceeds threshold P1 in the condenser bypass state. Therefore, heat pump heating controller 52 causes selector 19 to switch the communication state to the no-bypass state. That is, selector 19 blocks all of shared passage 18a, first branch passage 18b, and second branch passage 18c illustrated in FIG. 1 (closes the condenser-side water valve and the evaporator-side water valve). Thus, the flow rate of the coolant in second water-refrigerant heat exchanger 12 (condenser) is returned, which brings a normal operation.

Refrigerant pressure Pd temporarily decreases at time t2, but again starts to increase due to the engine waste heat.

At time t3, refrigerant pressure Pd exceeds threshold P3 in the no-bypass state. Therefore, heat pump heating controller 52 causes selector 19 to switch the communication state to the evaporator bypass state. That is, selector 19 opens the evaporator-side water valve so as to allow communication between shared passage 18a and second branch passage 18c illustrated in FIG. 1. Thus, the flow rate of the coolant in first water-refrigerant heat exchanger 11 (evaporator) is decreased. Accordingly, an amount of heat supplied to the refrigerant from the coolant is decreased in first water-refrigerant heat exchanger 11, whereby the time at which refrigerant pressure Pd reaches upper limit Pmax can be delayed.

Refrigerant pressure Pd temporarily decreases at time t3, but again starts to increase due to a lot of engine waste heat.

At time t4, refrigerant pressure Pd reaches the upper limit Pmax, so that the drive of compressor 38 is stopped. At that time, the water temperature is sufficiently high for providing heating for the vehicle interior and the amount of heat for keeping heating for the vehicle interior can be obtained from the engine waste heat.

The engine water temperature at time t4 is sufficiently high to keep appropriate heating performance even if the heat pump operation is not activated. As described above, heat pump heating controller 52 switches the bypass path of bypass passage 18 in such a manner that refrigerant pressure Pd assumes a value between thresholds P2 and P3, thereby continuing the heat pump operation, and thus, is capable of exhibiting high heating performance.

[Second Operation Example of Switching Control of Water Path in Heat Pump Heating Mode]

Figure 5:
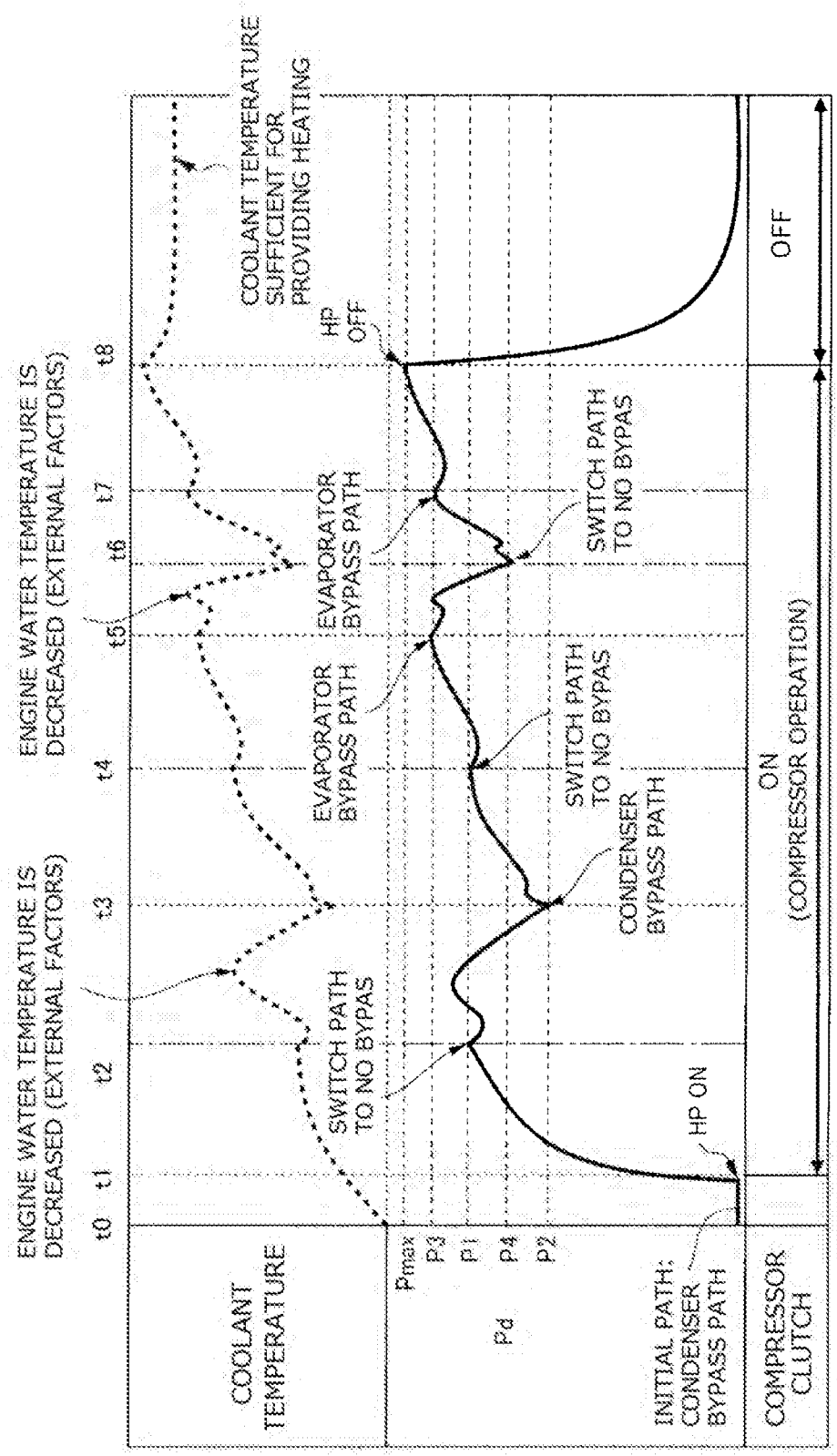
FIG. 5 is a diagram illustrating another control example of the heat pump heating controller in the air conditioning device for vehicle illustrated in FIG. 1.

FIG. 5 indicates the control example in the case where the water temperature greatly changes from the start of the engine and compressor 38 due to external factors.

When the engine water temperature greatly drops in a latter half period between time t2 and time t3 due to external factors, refrigerant pressure Pd also greatly decreases with this drop.

At time t3, refrigerant pressure Pd falls below threshold P2 in the no-bypass state. Therefore, heat pump heating controller 52 causes selector 19 to switch the communication state to the condenser bypass state. That is, selector 19 opens the condenser-side water valve so as to allow communication between shared passage 18a and first branch passage 18b illustrated in FIG. 1. Thus, the flow rate of the coolant in second water-refrigerant heat exchanger 12 (condenser) is decreased. Accordingly, the coolant is rapidly heated in second water-refrigerant heat exchanger 12, resulting in the temperature rise of the coolant sent to heater core 44. In addition, refrigerant pressure Pd increases.

When the communication state is switched to the evaporator bypass state at time t5, and then, the engine water temperature greatly drops due to external factors, refrigerant pressure pd also greatly decreases with this drop.

Since refrigerant pressure Pd falls below threshold P4 at time t6, heat pump heating controller 52 causes selector 19 to switch the communication state to the no-bypass state. That is, selector 19 blocks all of shared passage 18a, first branch passage 18b, and second branch passage 18c illustrated in FIG. 1. Thus, the flow rate of the coolant in first water-refrigerant heat exchanger 11 (evaporator) is increased. Accordingly, the refrigerant is heated in first water-refrigerant heat exchanger 11, so that refrigerant pressure Pd increases. Further, since refrigerant pressure Pd increases, the coolant is strongly heated in second water-refrigerant heat exchanger 12, resulting in an increase in the temperature of the coolant.

As described above, hear pump heating controller 52 switches the bypass path of bypass passage 18 in such a manner that refrigerant pressure Pd assumes a value between thresholds P2 and P3, thereby continuing the heat pump operation and, as a result, being capable of exhibiting high heating performance.

In the case where compressor 38 is driven by engine power and refrigerant pressure Pd increases with the temperature rise of the coolant, refrigerant pressure Pd can be reduced by turning off a clutch. However, if the clutch is more frequently turned on and off, driving comfort felt by a driver is deteriorated. On the other hand, according to air conditioning device for vehicle 1 in the present exemplary embodiment, refrigerant pressure Pd can be decreased through the switch to the second bypass passage (evaporator bypass state), which reduces the frequency of turning on and off the clutch of compressor 38. As described above, air conditioning device for vehicle 1 according to the present exemplary embodiment can suppress the deterioration in driving comfort due to switching of a clutch.

As described above, air conditioning device for vehicle 1 according to the present exemplary embodiment can exhibit high heating performance by the switching to the second bypass passage (evaporator bypass state) and the switching to the first bypass passage (condenser bypass state).

As illustrated in FIG. 1, a part of the first bypass passage and a part of the second bypass passage are shared as shared passage 18a. As described above, the second bypass passage and the first bypass passage are not simultaneously used. Therefore, selector 19 formed as a unit to switch the communication state of bypass passage 18 can be used. Thus, downsizing of air conditioning device for vehicle 1 as a whole and reduction in cost can be implemented.

The present exemplary embodiment has been described above. The present exemplary embodiment describes the case in which four thresholds P3, P1, P4, P2 are set to be decreased in this order in a stepwise manner. However, the condition for the control is established, so long as threshold P3 is larger than threshold P2.

Figure 6:
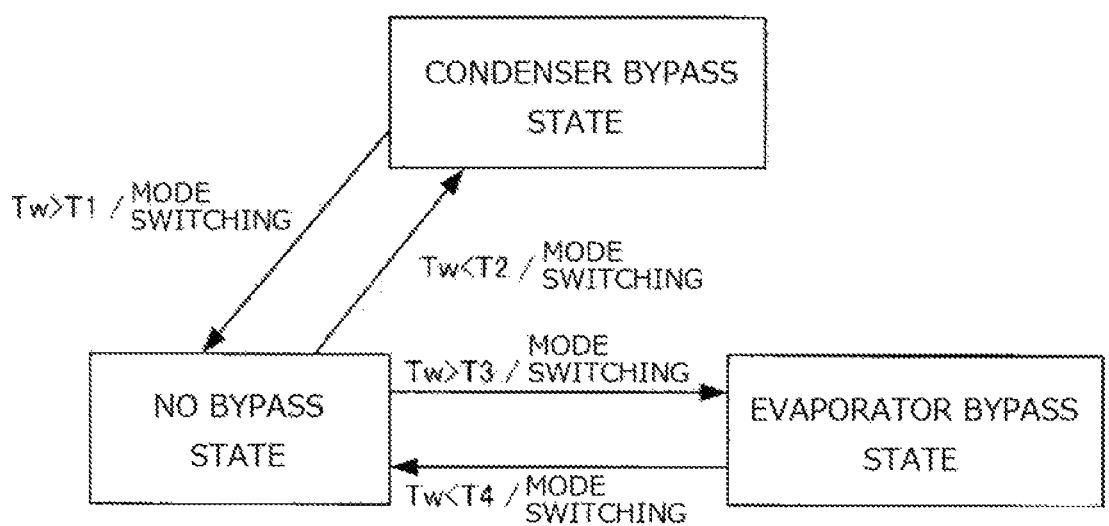
FIG. 6 is a diagram illustrating a state transition of a bypass passage according to a water temperature in the air conditioning device for vehicle illustrated in FIG. 1.

The present exemplary embodiment describes the case in which the heat pump heating control is performed using refrigerant pressure Pd. However, the heat pump heating control is not limited to the use of refrigerant pressure Pd, and may be performed on the basis of temperature Tw of the coolant. FIG. 6 is a diagram illustrating the state transition of the communication state of bypass passage 18 which is switched according to temperature Tw of the coolant. Specifically, when coolant temperature Tw exceeds threshold T3 in the no-bypass state, heat pump heating controller 52 switches the communication state to the evaporator bypass state. On the other hand, when coolant temperature Tw falls below threshold T2 in the no-bypass state, heat pump heating controller 52 switches the communication state to the condenser bypass state. Further, when coolant temperature Tw falls below threshold T4 in the evaporator bypass state, heat pump heating controller 52 switches the communication state to the no-bypass state. Further, when coolant temperature TW exceeds threshold T1 in the condenser bypass state, heat pump heating controller 52 switches the communication state to the no-bypass state. In this case, threshold T1 may be equal to or larger than threshold T2. Further, threshold T3 may be equal to or larger than T4. Further, threshold T2 may be less than threshold T3. Further, threshold T1 and threshold T3 may be the same, and threshold T2 and threshold T4 may be the same. Further, threshold T1 may be the same as threshold T4 or may be less than threshold T4. The condition for the control is established, so long as threshold T3 is larger than threshold T2 in four thresholds T1, T2, T3, T4.

In addition, in the present exemplary embodiment, the condition based on the water temperature at the inlet of second water-refrigerant heat exchanger 12 or the condition based on the discharge pressure of compressor 38 has been described as the condition for switching the water circuit. However, the water temperature and the refrigerant pressure may be detected at other locations. In addition, an appropriate value obtained from experiments or the like may be set for a threshold of a water temperature or a threshold of a refrigerant pressure, based on which the water circuit is switched.

An engine has been described in the present exemplary embodiment as an example of a heating component of the vehicle. However, various heating components may be adopted such as a driving electric motor in an electric vehicle and a secondary battery for supplying power for driving, as the heating component of the vehicle.

Figure 7:
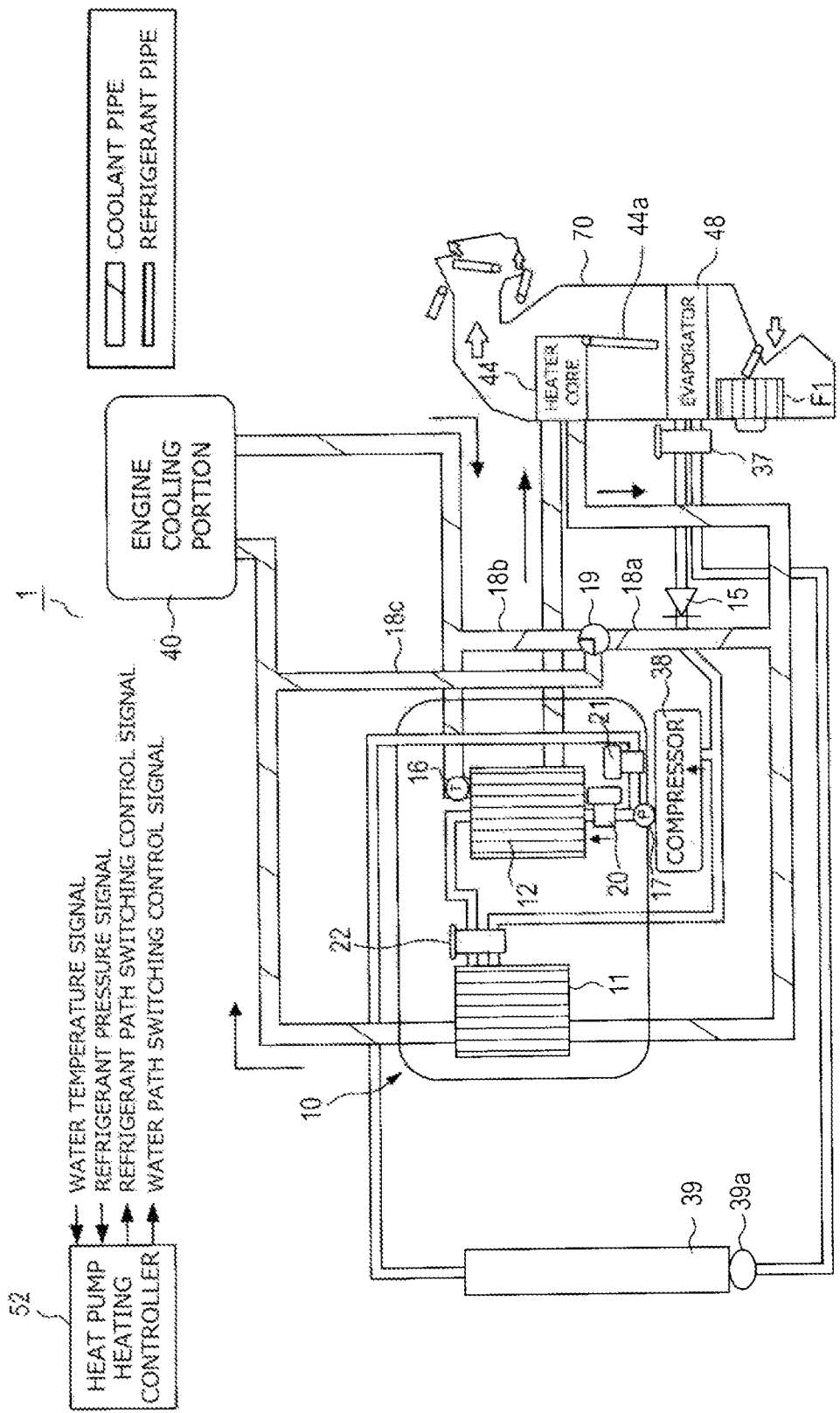
FIG. 7 is a diagram illustrating a modification of the configuration of the air conditioning device for vehicle according to the exemplary embodiment of the present disclosure.

Further, in the present exemplary embodiment (FIG. 1), a first refrigerant circuit and a second refrigerant circuit can be switched by ON-OFF control of ON-OFF valve 13 provided to the refrigerant pipe. In the first refrigerant circuit, a refrigerant circulates through compressor 38, second water-refrigerant heat exchanger 12, electromagnetic-valve-equipped expansion valve 14, and first water-refrigerant heat exchanger 11 in this order. In the second refrigerant circuit, a refrigerant circulates through compressor 38, second water-refrigerant heat exchanger 12, outside condenser 39, and evaporator 48 in this order. However, the refrigerant path is not limited thereto. For example, second water-refrigerant heat exchanger 12 is included in the second refrigerant circuit in FIG. 1. However, second water-refrigerant heat exchanger 12 may be eliminated from the second refrigerant circuit as refrigerant circuit illustrated in FIG. 7. That is, the second refrigerant circuit may be configured as a refrigerant circuit in which a refrigerant circulates through compressor 38, outside condenser 39, and evaporator 48 in this order. In this case, the path for the refrigerant discharged from compressor 38 is switched by ON-OFF control of ON-OFF valve 20 and ON-OFF valve 21 provided to the pipe at the discharge side of compressor 38 as illustrated in FIG. 7. Further, electromagnetic-valve-equipped expansion valve 14 is provided at the refrigerant inlet of first water-refrigerant heat exchanger 11 so as to prevent the refrigerant from flowing into first water-refrigerant heat exchanger 11 during cooling in FIG. 1. On the other hand, a TXV may be used for expansion valve 22 in FIG. 7 since the refrigerant does not flow into first water-refrigerant heat exchanger 11 during cooling.

The present disclosure is applicable to a vehicular air conditioning device mounted on various vehicles such as an engine vehicle, an electric automobile or an HEV (Hybrid Electric Vehicles).

What is claimed is:

1. An air conditioning device for a vehicle, the air conditioning device comprising:
    a compressor that compresses a refrigerant;
    a heater core that heats air to be sent into a vehicle interior;
    a first water-refrigerant heat exchanger that exchanges heat between the refrigerant of low-temperature and low-pressure and a coolant for heat transport to vaporize the refrigerant of low-temperature and low-pressure;
    a second water-refrigerant heat exchanger that exchanges heat between the refrigerant of high-temperature and high-pressure discharged from the compressor and the coolant to condense the refrigerant of high-temperature and high-pressure, and provides the heated coolant to the heater core;
    a first conduit having a first end and a second end;
    a second conduit having a first end and a second end,
        the second end of the first conduit connected to the first end of the second conduit to define a first bypass passage,
        the first end of the first conduit branching from a first inlet conduit fluidly connected to an inlet port of the first water-refrigerant heat exchanger and the second end of the second conduit branching from a second inlet conduit fluidly connected to an inlet port of the second water-refrigerant heat exchanger wherein fluid flowing along the first bypass passage bypasses the second water-refrigerant heat exchanger and the heater core; and
    a third conduit having a first end and a second end,
        the second end of the first conduit connected to the first end of the third conduit to define a second bypass passage,
        the second end of the third conduit branching from an outlet conduit fluidly connected to an outlet port of the first water-refrigerant heat exchanger wherein fluid flowing along the second bypass passage bypasses the first water-refrigerant heat exchanger.

2. The air conditioning device for a vehicle according to claim 1, the air conditioning device further comprising a selector,
    wherein:
    the part shared by the first bypass passage and the second bypass passage is defined as a shared passage, a part of the first bypass passage excluding the shared passage is defined as a first branch passage, and a part of the second bypass passage excluding the shared passage is defined as a second branch passage, and
    the selector is formed into one unit and switches to one of three communication states in which the first branch passage, the second branch passage, and the shared passage communicate, the three communication states being a state of blocking all passages, a state of allowing only communication between the first branch passage and the shared passage, and a state of allowing only communication between the second branch passage and the shared passage.

3. The air conditioning device for a vehicle according to claim 1, the air conditioning device further comprising a controller that performs a control to allow the coolant to divert to the first bypass passage or the second bypass passage, based on a parameter indicating a driving condition of the air conditioning device for the vehicle,
wherein:
the controller switches to a state in which a bypass by the second bypass passage is set from a state in which neither a bypass by the first bypass passage nor the bypass by the second bypass passage is set, when the parameter exceeds an upper threshold, and
the controller switches to a state in which the bypass by the first bypass passage is set from a state in which neither the bypass by the first bypass passage nor the bypass by the second bypass passage is set, when the parameter falls below a lower threshold that is lower than the upper threshold.

4. The air conditioning device for a vehicle according to claim 3, wherein:
the controller switches to the state in which neither the bypass by the first bypass passage nor the bypass by the second bypass passage is set, when the parameter falls below a middle-lower threshold that is set to be equal to or lower than the upper threshold with the state in which the bypass by the second bypass passage is set, and
the controller switches to the state in which neither the bypass by the first bypass passage nor the bypass by the second bypass passage is set, when the parameter exceeds a middle-upper threshold that is set to be equal to or higher than the lower threshold with the state in which the bypass by the first bypass passage is set.

5. The air conditioning device for a vehicle according to claim 4, wherein
the upper threshold, the middle-upper threshold, the middle-lower threshold, and the lower threshold are set to be decreased in this order in a stepwise manner.

6. The air conditioning device for a vehicle according to claim 3, wherein
the parameter is a refrigerant pressure or a coolant temperature.

\* \* \* \* \*